United States Patent
Katsuta

(10) Patent No.: US 10,379,415 B2
(45) Date of Patent: Aug. 13, 2019

(54) DISPLAY APPARATUS

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 89 days.

(21) Appl. No.: 15/626,441

(22) Filed: Jun. 19, 2017

(65) Prior Publication Data

US 2017/0371193 A1   Dec. 28, 2017

(30) Foreign Application Priority Data

Jun. 24, 2016   (JP) .................................. 2016-125443

(51) Int. Cl.
| | | |
|---|---|---|
| G02F 1/1362 | (2006.01) | |
| G02F 1/1368 | (2006.01) | |
| G02F 1/167 | (2019.01) | |
| G09G 3/34 | (2006.01) | |

(52) U.S. Cl.
CPC ........ *G02F 1/13624* (2013.01); *G02F 1/1368* (2013.01); *G02F 1/136286* (2013.01); *G02F 1/167* (2013.01); *G09G 3/344* (2013.01); *G02F 2001/136245* (2013.01); *G09G 2300/0823* (2013.01); *G09G 2300/0842* (2013.01); *G09G 2330/023* (2013.01)

(58) Field of Classification Search
CPC ........... G02F 1/13624; G02F 1/136286; G02F 1/1368; G02F 1/167; G02F 2001/136245; G09G 2300/0823; G09G 2300/0842; G09G 2330/023; G09G 3/344

See application file for complete search history.

(56) References Cited

U.S. PATENT DOCUMENTS

| | | | | |
|---|---|---|---|---|
| 5,952,854 | A * | 9/1999 | Kubota | G09G 3/3688 327/91 |
| 6,859,193 | B1* | 2/2005 | Yumoto | G09G 3/3216 315/169.3 |
| 2002/0075205 | A1* | 6/2002 | Kimura | G09G 3/3659 345/55 |
| 2003/0001828 | A1* | 1/2003 | Asano | G09G 3/3241 345/204 |
| 2007/0279374 | A1* | 12/2007 | Kimura | G02F 1/133555 345/102 |
| 2008/0238899 | A1* | 10/2008 | Yamada | G09G 3/344 345/204 |

(Continued)

FOREIGN PATENT DOCUMENTS

JP   2014-10339 A   1/2014

*Primary Examiner* — Kenneth Bukowski
(74) *Attorney, Agent, or Firm* — K&L Gates LLP

(57) ABSTRACT

According to an aspect, a display apparatus includes: a display panel including a plurality of pixels each including a pixel capacitor and a pixel transistor, a scanning line that is coupled to the respective pixels and is configured to receive a scan signal, and a video signal line that is coupled to the respective pixels and is configured to receive a video signal; and a driver configured to drive the display panel. The pixel transistor includes: at least one N-channel metal oxide semiconductor (NMOS) transistor coupled between the video signal line and the pixel capacitor; and a P-channel metal oxide semiconductor (PMOS) transistor coupled in parallel with the NMOS transistor.

6 Claims, 9 Drawing Sheets

(56) References Cited

U.S. PATENT DOCUMENTS

2012/0019503 A1\* 1/2012 Lee .................... G09G 3/3659
 345/211
2014/0002889 A1 1/2014 Kaino et al.
2018/0108312 A1\* 4/2018 Aoki .................... G09G 3/3225

\* cited by examiner

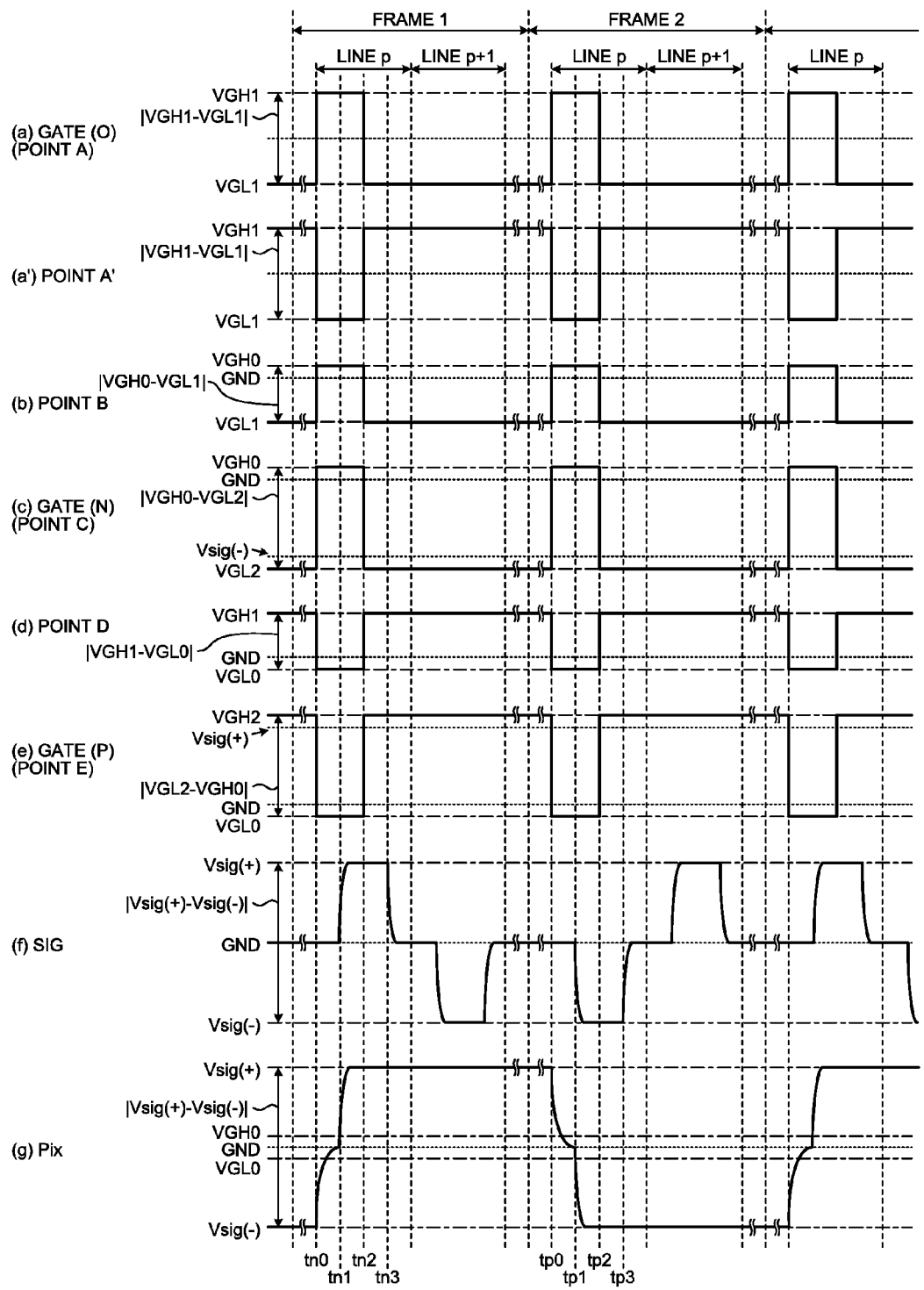

DISPLAY APPARATUS

CROSS-REFERENCE TO RELATED APPLICATIONS

This application claims priority from Japanese Application No. 2016-125443, filed on Jun. 24, 2016, the contents of which are incorporated by reference herein in its entirety.

TECHNICAL FIELD OF THE INVENTION

The present invention relates to a display apparatus.

BACKGROUND OF THE INVENTION

In recent years, demand has been increased for display apparatuses for mobile electronic apparatuses and the like, such as mobile phones and electronic paper. For example, Japanese Patent Application Laid-open Publication No. 2014-010339 discloses an electrophoretic display (EPD) used in the electronic paper in which each pixel has a memory property to maintain a potential when being rewritten. Once rewriting is performed for one frame, the potential of each pixel when being rewritten is maintained until it is rewritten for the next frame. This allows driving with low power consumption.

The voltage amplitude value of a gate drive signal applied to the gate of a pixel transistor depends on the voltage upper limit value and the voltage lower limit value of a source drive signal applied to the source of the pixel transistor. In other words, the voltage value of the gate drive signal for keeping the pixel transistor off needs to be lower than the voltage lower limit value of the source drive signal, and the voltage value of the gate drive signal for keeping the pixel transistor on needs to be higher than the voltage upper limit value of the source drive signal. In particular, the EPD needs to be driven by a higher voltage than that of a liquid crystal display panel and the like. Consequently, the potential difference between the voltage upper limit value and the voltage lower limit value of the source drive signal in the EPD is larger than the potential difference between the voltage upper limit value and the voltage lower limit value of the source drive signal in the liquid crystal display panel and the like, and thus the voltage amplitude value of the gate drive signal in the EPD is larger than the voltage amplitude value of the gate drive signal in the liquid crystal display panel and the like. This increases risk of property degradation in components constituting a gate drive circuit for generating the gate drive signal and in the pixel transistor, and may degrade reliability. The increase in the voltage amplitude value of the gate drive signal increases power consumption in the gate drive circuit, and reduces the advantage of the EPD capable of performing driving with low power consumption.

For the foregoing reasons, there is a need for a display apparatus capable of performing driving with low power consumption.

SUMMARY

According to an aspect, a display apparatus includes: a display panel including a plurality of pixels each including a pixel capacitor and a pixel transistor, a scanning line that is coupled to the respective pixels and is configured to receive a scan signal, and a video signal line that is coupled to the respective pixels and is configured to receive a video signal; and a driver configured to drive the display panel. The pixel transistor includes: at least one N-channel metal oxide semiconductor (NMOS) transistor coupled between the video signal line and the pixel capacitor; and a P-channel metal oxide semiconductor (PMOS) transistor coupled in parallel with the NMOS transistor.

BRIEF DESCRIPTION OF THE DRAWINGS

FIG. 9 is a diagram illustrating exemplary waveforms at various parts in the configuration illustrated in FIG. 7.

DETAILED DESCRIPTION

Figure 1:
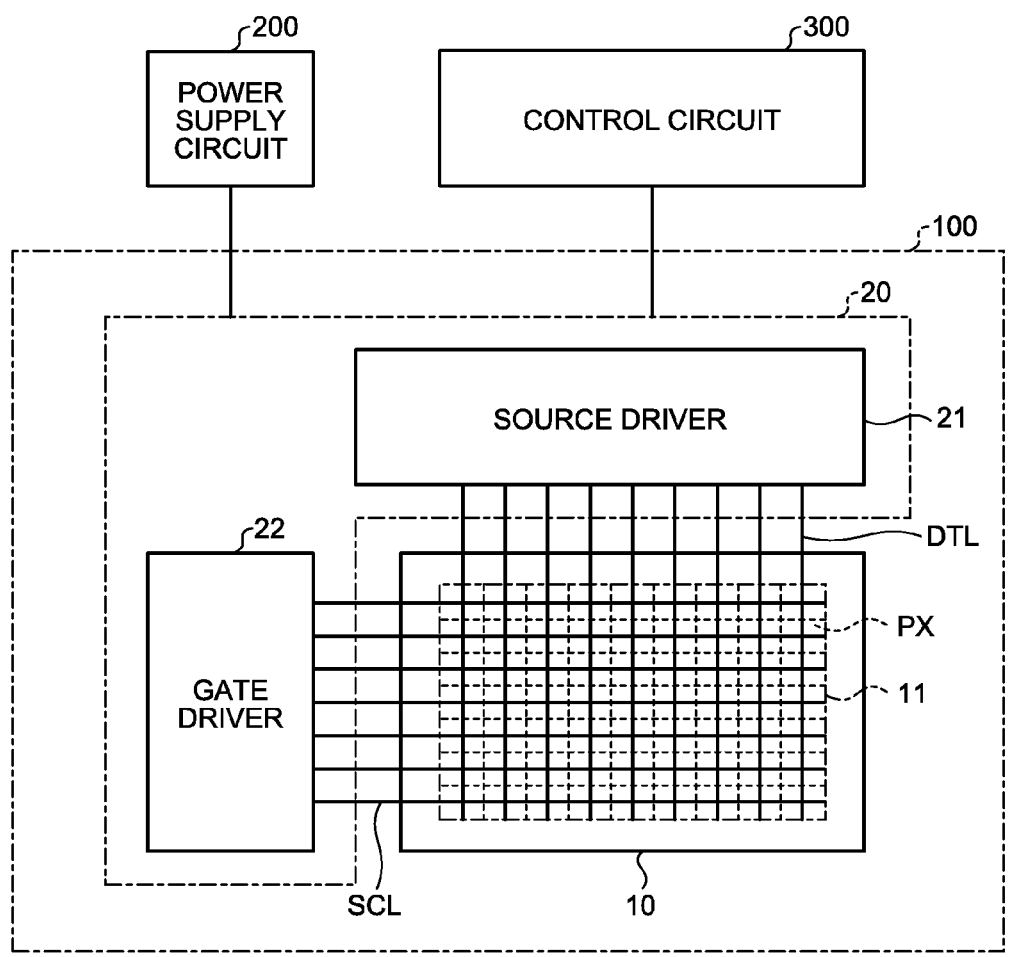
FIG. 1 is a block diagram illustrating an exemplary schematic configuration of a display system using a display apparatus according to a first embodiment of the present invention.

Modes (embodiments) for carrying out the present invention will be described in detail with reference to the drawings. The present invention is not limited by the descriptions of the following embodiments. The elements described hereunder include those that can be easily thought of by those skilled in the art and substantially the same elements. The elements described hereunder may also be combined as appropriate. The disclosure is merely an example, and the present invention naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same elements as those described in the drawings that have already been discussed are denoted by the same reference numerals throughout the description and the drawings, and detailed description thereof will not be repeated in some cases.

First Embodiment

Figure 2:
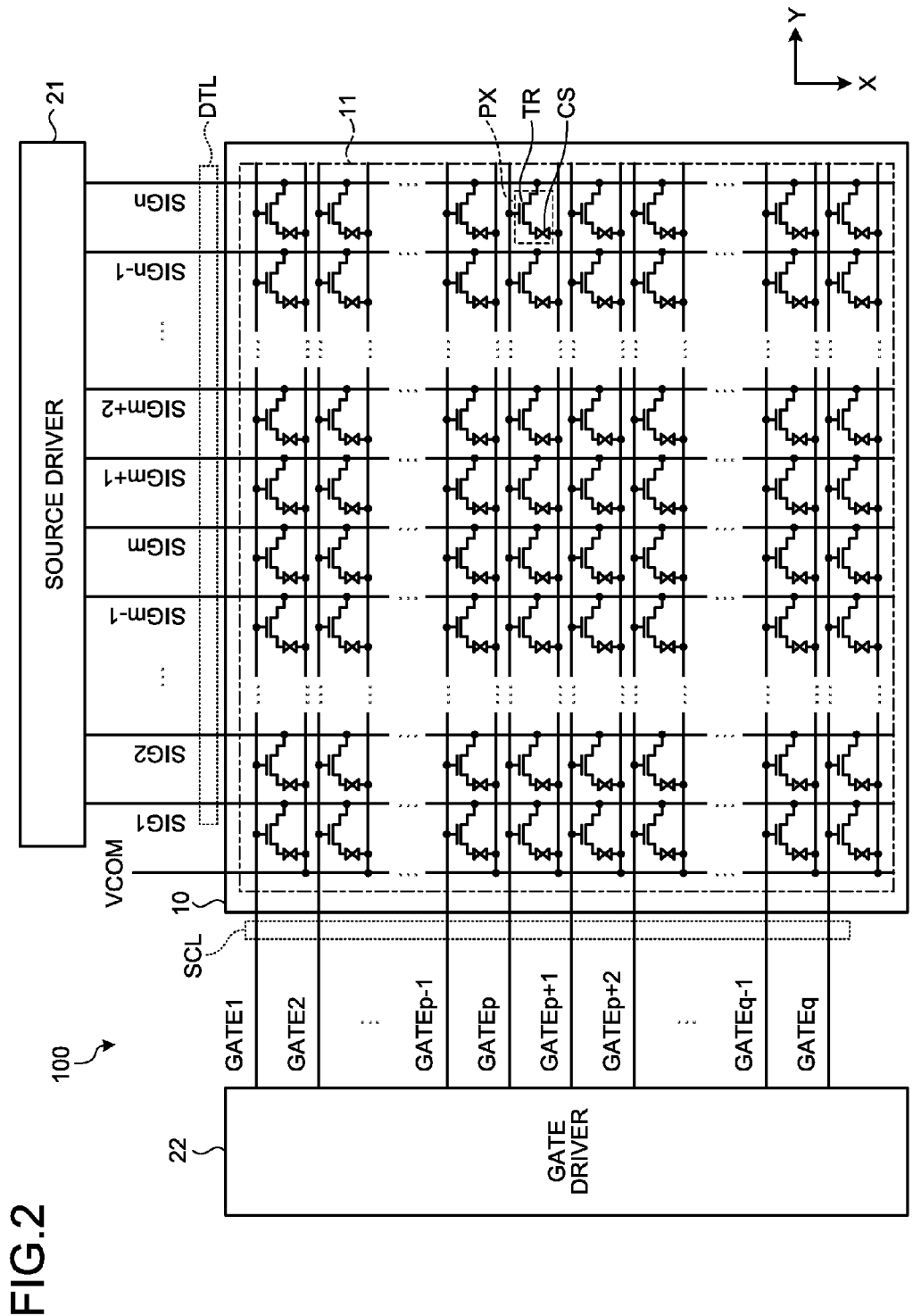
FIG. 2 is a diagram illustrating an exemplary schematic configuration of the display apparatus according to the first embodiment.

FIG. 1 is a block diagram illustrating an exemplary schematic configuration of a display system using a display apparatus according to a first embodiment of the present invention. FIG. 2 is a diagram illustrating an exemplary schematic configuration of the display apparatus according to the first embodiment.

This display apparatus 100 according to the first embodiment is supplied with various power supply voltages from, for example, a power supply circuit 200 of an electronic apparatus equipped with the display apparatus 100, and displays an image based on an output signal output from, for example, a control circuit 300 serving as a host processor of the electronic apparatus. Examples of the electronic apparatus equipped with the display apparatus 100 include, but are not limited to, an electronic paper display apparatus.

In the example illustrated in FIG. 1, the display apparatus 100 is, for example, an electrophoretic display apparatus including electrophoretic elements. The display apparatus 100 includes a display panel 10 and a display panel driver 20. The configuration of the display panel 10 is not specifically limited, and a known device such as a reflective liquid crystal display panel can be used as the display panel 10. The display panel 10 may be a monochrome display panel or a color display panel using color filters in a plurality of colors. The display panel 10 may employ a light-reflecting material for pixel electrodes thereof, or may have a configuration in which light-transmitting pixel electrodes are combined with a reflective film, such as a metal film, and the reflective film reflects the light. The display panel 10 may be a flexible display, such as a sheet display.

The power supply circuit 200 is a power source generator that generates the power supply voltages to be supplied to components of the display apparatus 100 according to the present embodiment. The power supply circuit 200 is coupled to the display panel driver 20.

The control circuit 300 is an arithmetic processor that controls operations of the display apparatus 100 according to the present embodiment. The control circuit 300 is coupled to the display panel driver 20.

A plurality of pixels PX are arranged in a matrix to constitute a display area 11 on the display panel 10. In the example illustrated in FIG. 2, n □ q pixels PX (n pixels PX in the row direction and q pixels PX in the column direction), each including a pixel transistor (such as a thin-film transistor (TFT)) TR and a pixel capacitor CS, are arranged in a two-dimensional matrix on the display panel 10. The example illustrated in FIG. 2 represents an example in which the pixels PX are arranged in a matrix in a two-dimensional XY coordinate system. In this example, the row direction corresponds to the X-direction, and the column direction corresponds to the Y-direction. Hereinafter, the pixels PX arranged in the X-direction (row direction) will be called a "pixel row", and the pixels PX arranged in the Y-direction (column direction) will be called a "pixel column". In each of the pixels PX, the source of the pixel transistor TR is coupled to a video signal line DTL, and is supplied with a source drive signal (video signal) SIGm (m is 1 to n). In each of the pixels PX, the gate of the pixel transistor TR is coupled to a scanning line SCL, and is supplied with a gate drive signal (scan signal) GATEp (p is 1 to q). In each of the pixels PX, the drain of the pixel transistor TR is coupled to one end (pixel electrode) of the pixel capacitor CS, and the other end (common electrode) of the pixel capacitor CS is supplied with a common potential VCOM.

The display panel driver 20 includes a source driver 21 and a gate driver 22.

The display panel driver 20 causes the source driver 21 to hold and sequentially output a video signal to the display panel 10. The source driver 21 is electrically coupled to the display panel 10 through the video signal lines DTL, and transmits the source drive signals (video signals) SIG1, SIGn on a pixel column-by-pixel column basis. Each of the source drive signals (video signals) SIG1, . . . , SIGn is supplied to the sources of the pixel transistors of the pixels PX in a corresponding pixel column.

The display panel driver 20 causes the gate driver 22 including, for example, shift registers to select each of the pixels PX on the display panel 10, and controls on/off of the pixel transistor of each pixel PX. The gate driver 22 is electrically coupled to the display panel 10 through the scanning lines SCL, and transmits the gate drive signals (scan signals) GATE1, . . . , GATEq on a pixel row-by-pixel row basis. Each of the gate drive signals (scan signals) GATE1, . . . , GATEq is supplied to the gates of the pixel transistors TR of the pixels PX in a corresponding pixel row.

Figure 3:
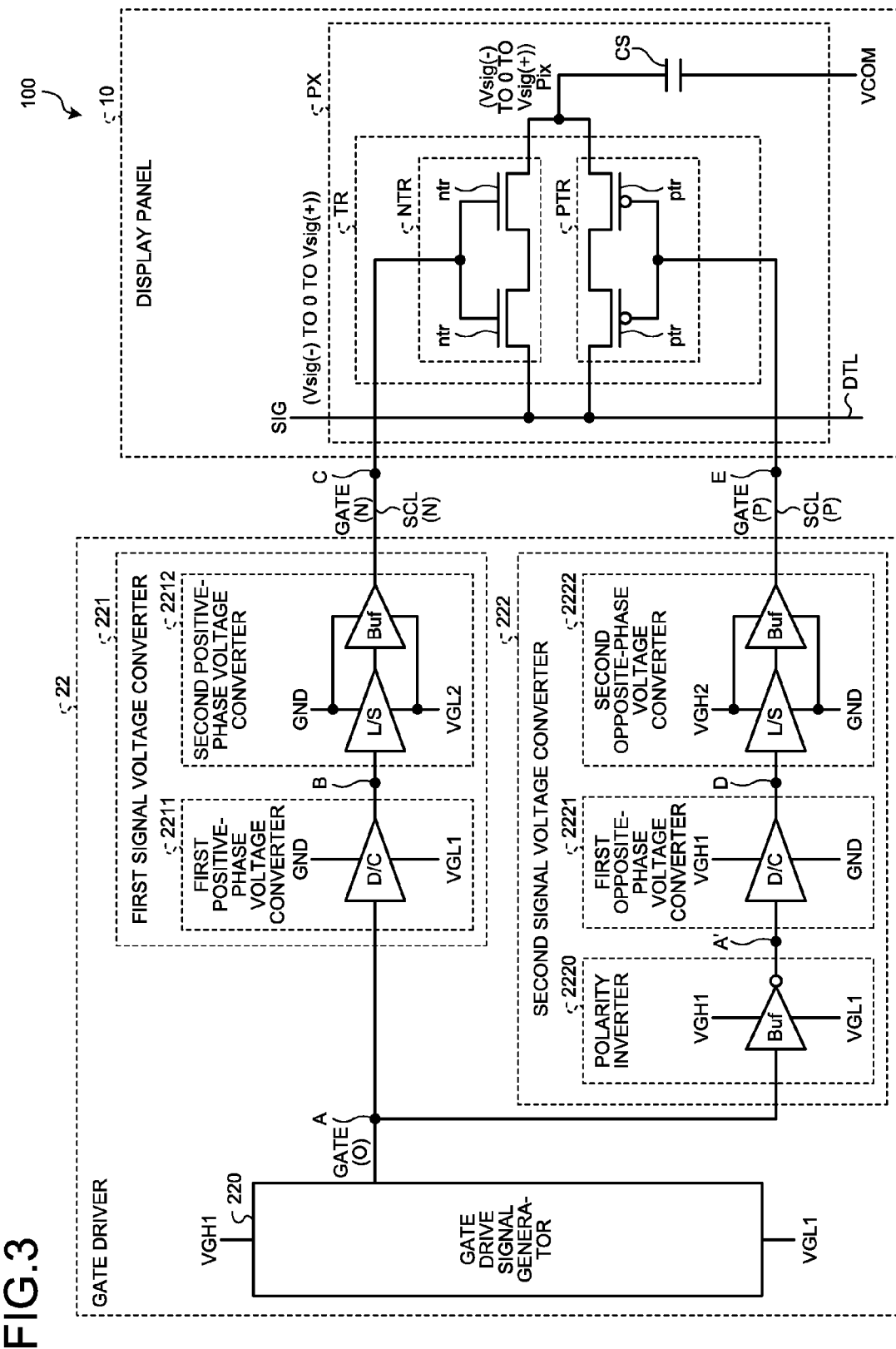
FIG. 3 is a diagram illustrating an exemplary configuration of a pixel transistor and that of a gate driver in the display apparatus according to the first embodiment.
Figure 4:
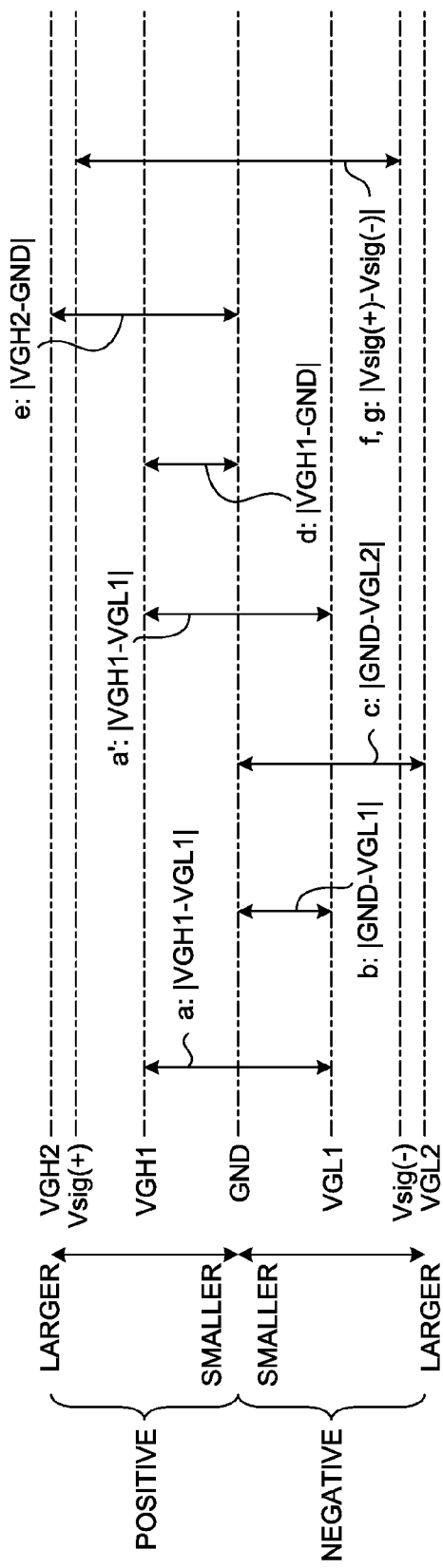
FIG. 4 is a diagram illustrating a magnitude relation among voltages at various parts and voltage ranges at the various parts in the configuration illustrated in FIG. 3.
Figure 5:
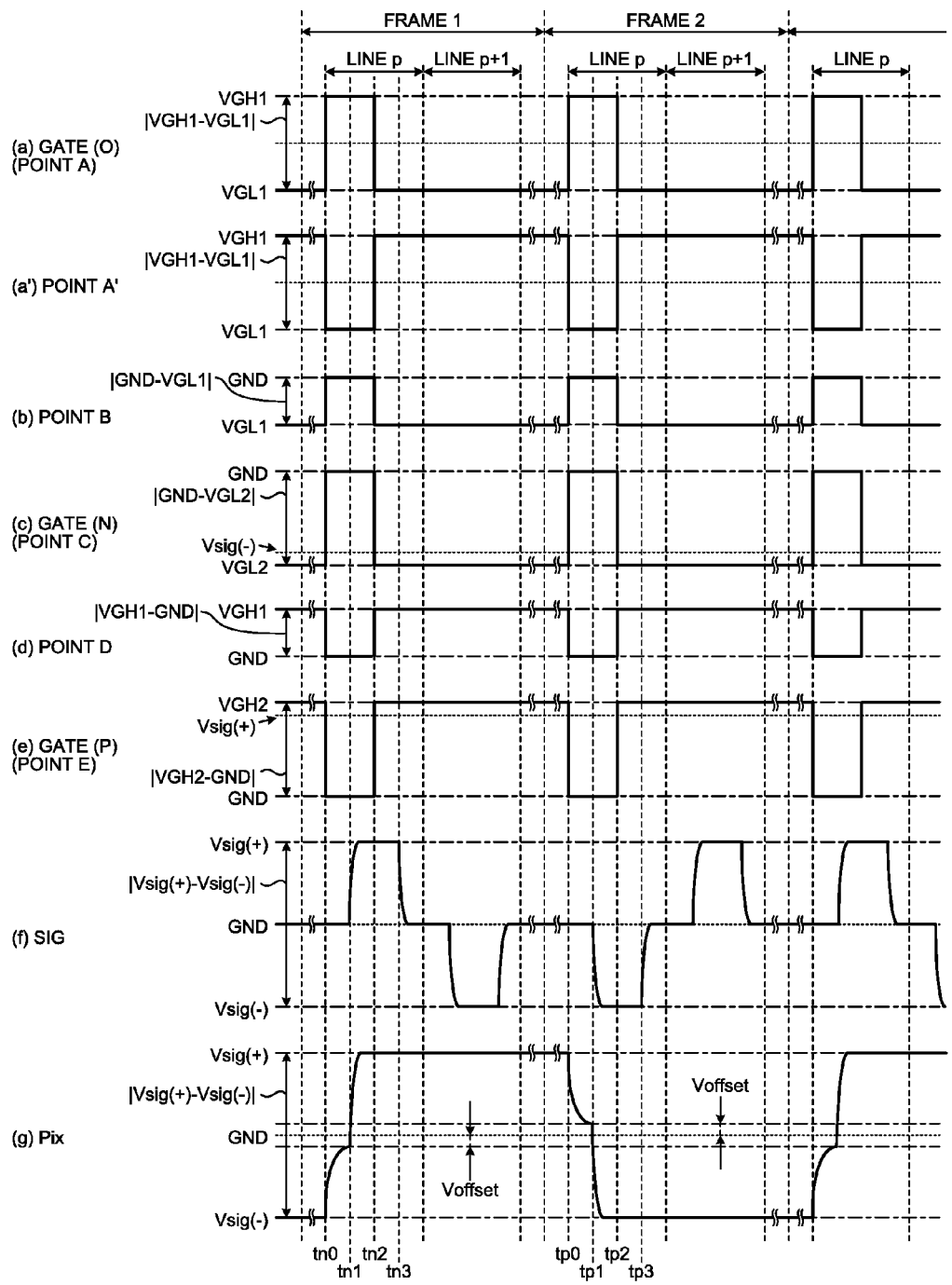
FIG. 5 is a diagram illustrating exemplary waveforms at various parts in the configuration illustrated in FIG. 3.

FIG. 3 is a diagram illustrating an exemplary configuration of the pixel transistor and that of the gate driver in the display apparatus according to the first embodiment. The example illustrated in FIG. 3 represents a configuration in one of the pixels PX at the m-th row and the p-th column, but symbols m and p for indicating the pixel PX at the m-th row and the p-th column are omitted. FIG. 4 is a diagram illustrating a magnitude relation among voltages at various parts and voltage ranges at the various parts in the configuration illustrated in FIG. 3. FIG. 5 is a diagram illustrating exemplary waveforms at various parts in the configuration illustrated in FIG. 3. In the present embodiment, a voltage on the positive side of a ground (GND) potential is called a "positive voltage", and a voltage on the negative side of the GND potential is called a "negative voltage".

In the description of the examples illustrated in FIGS. 1 and 2, each of the pixel rows is provided with one scanning line SCL, and is supplied with the gate drive signal GATEp (p is 1 to q). In the present embodiment, as illustrated in FIG. 3, the gate driver 22 and the display panel 10 are electrically coupled to each other through a first scanning line SCL (N) and a second scanning line SCL (P) on a pixel row-by-pixel row basis. The gate driver 22 generates and supplies an N-channel metal oxide semiconductor (NMOS) gate drive signal GATEp (N) (p is 1 to q; noted as "GATE (N)" in the example illustrated in FIG. 3) to the first scanning line SCL (N), and generates and supplies a P-channel metal oxide semiconductor (PMOS) gate drive signal GATEp (P) (p is 1 to q; noted as "GATE (P)" in the example illustrated in FIG. 3) with polarity inverted from that of the NMOS gate drive signal GATEp (N) (p is 1 to q; noted as "GATE (N)" in the example illustrated in FIG. 3) to the second scanning line SCL (P).

The pixel transistor TR of the pixel PX according to the present embodiment includes an NMOS transistor NTR coupled between the source drive signal (video signal) SIG and a pixel electrode Pix of the pixel capacitor CS, and also includes a PMOS transistor PTR coupled in parallel with the NMOS transistor NTR.

The first scanning line SCL (N) and the second scanning line SCL (P) are coupled to the gate of the NMOS transistor NTR and the gate of the PMOS transistor PTR, respectively, included in the pixel transistor TR.

The source of the NMOS transistor NTR and that of the PMOS transistor PTR are coupled in parallel with each other, and the drain of the NMOS transistor NTR and that of the PMOS transistor PTR are coupled in parallel with each other. The video signal line DTL is coupled to the sources of the NMOS transistor NTR and the PMOS transistor PTR, and the pixel capacitor CS is coupled to the drains of the NMOS transistor NTR and the PMOS transistor PTR.

The sources of the NMOS transistor NTR and the PMOS transistor PTR are supplied with the source drive signal (video signal) SIG having a voltage upper limit value of Vsig(+) and a voltage lower limit value of Vsig(−) from the source driver 21 through the video signal line DTL. In the present embodiment, the voltage upper limit value Vsig(+)

and the voltage lower limit value Vsig(−) of the source drive signal (video signal) SIG have an equal potential difference from the GND potential (|Vsig(+)−GND|=|GND−Vsig(−)|). In other words, the GND potential is set at the middle value of the potential difference between the voltage upper limit value Vsig(+) and the voltage lower limit value Vsig(−) of the source drive signal (video signal) SIG.

In the present embodiment, the gate of the NMOS transistor NTR and the gate of the PMOS transistor PTR are controlled to be turned on by the GND potential at the middle value of the potential difference between the voltage upper limit value Vsig(+) and the voltage lower limit value Vsig(−) of the source drive signal (video signal) SIG through the first scanning line SCL (N) and the second scanning line SCL (P), respectively.

The gate of the PMOS transistor PTR is supplied with a positive voltage that is higher than the GND potential, and that of the NMOS transistor NTR is supplied with a negative voltage that is lower than the GND potential. The source of the PMOS transistor PTR is coupled to the video signal line DTL, and that of the NMOS transistor NTR is coupled to the video signal line DTL. Thus, when the source drive signal (video signal) SIG to be applied to the video signal line DTL has a negative voltage, the PMOS transistor PTR is not turned on, the gate of the NMOS transistor NTR is supplied with the GND potential, and the NMOS transistor NTR is turned on if the potential of the source drive signal (video signal) SIG is equal to or lower than a threshold voltage value of the NMOS transistor NTR. When the source drive signal (video signal) SIG to be applied to the video signal line DTL has a positive voltage, the NMOS transistor NTR is not turned on, the gate of the PMOS transistor PTR is supplied with the GND potential, and the PMOS transistor PTR is turned on if the potential of the source drive signal (video signal) SIG is equal to or higher than a threshold voltage value of the PMOS transistor PTR.

The configuration illustrated in FIG. 3 represents an example in which the NMOS transistor NTR is constituted by two NMOS transistors ntr coupled in series, and the PMOS transistor PTR is constituted by two PMOS transistors ptr coupled in series. However, the NMOS transistor NTR may be constituted by one NMOS transistor ntr, and the PMOS transistor PTR may be constituted by one PMOS transistor ptr. Alternatively, the NMOS transistor NTR may be constituted by three or more NMOS transistors ntr coupled in series, and the PMOS transistor PTR may be constituted by the same number of serially coupled PMOS transistors ptr as that of the NMOS transistors ntr.

As illustrated in FIG. 3, the gate driver 22 according to the present embodiment includes a gate drive signal generator 220, a first signal voltage converter 221, and a second signal voltage converter 222.

The gate drive signal generator 220 is constituted by, for example, a shift register circuit. The gate drive signal generator 220 is supplied with a first positive voltage VGH1 and a first negative voltage VGL1 as power supply, and sequentially generates, on a pixel row-by-pixel row basis, a gate drive original signal GATE (O) that changes from a lower potential (first negative voltage VGL1) to a higher potential (first positive voltage VGH1) for a predetermined period of time.

The first signal voltage converter 221 includes a first positive-phase voltage converter 2211 and a second positive-phase voltage converter 2212.

The first positive-phase voltage converter 2211 is constituted by, for example, a down-converter circuit. The first positive-phase voltage converter 2211 is supplied with the GND potential and the first negative voltage VGL1 as power supply, and converts the gate drive original signal GATE (O) output from the gate drive signal generator 220, that is, the higher potential than the GND potential (first positive voltage VGH1) at a point A illustrated in FIG. 3 into the GND potential.

The second positive-phase voltage converter 2212 is constituted by, for example, a level shifter circuit and a buffer circuit. The second positive-phase voltage converter 2212 is supplied with the GND potential and a second negative voltage VGL2 that is larger than the first negative voltage VGL1 on the negative side of the GND potential, as power supply. The second positive-phase voltage converter 2212 converts the output signal from the first positive-phase voltage converter 2211, that is, the lower potential at a point B illustrated in FIG. 3 from the first negative voltage VGL1 to the second negative voltage VGL2, and outputs the result as the NMOS gate drive signal GATE (N) to the gate of the NMOS transistor NTR of the pixel transistor TR, that is, to a point C illustrated in FIG. 3.

The second signal voltage converter 222 includes a polarity inverter 2220, a first opposite-phase voltage converter 2221, and a second opposite-phase voltage converter 2222.

The polarity inverter 2220 is constituted by, for example, an inverting buffer circuit. The polarity inverter 2220 is supplied with the first positive voltage VGH1 and the first negative voltage VGL1 as power supply, and inverts the polarity of the gate drive original signal GATE (O) output from the gate drive signal generator 220, that is, the polarity at the point A illustrated in FIG. 3.

The first opposite-phase voltage converter 2221 is constituted by, for example, a down-converter circuit. The first opposite-phase voltage converter 2221 is supplied with the GND potential and the first positive voltage VGH1 as power supply, and converts the output signal from the polarity inverter 2220, that is, the lower potential (first negative voltage VGL1) at a point A' illustrated in FIG. 3 into the GND potential.

The second opposite-phase voltage converter 2222 is constituted by, for example, a level shifter circuit and a buffer circuit. The second opposite-phase voltage converter 2222 is supplied with the GND potential and a second positive voltage VGH2 larger on the positive side than the first positive voltage VGH1 as power supply. The second opposite-phase voltage converter 2222 converts the output signal from the first opposite-phase voltage converter 2221, that is, the higher potential (first positive voltage VGH1) at a point D illustrated in FIG. 3 into the second positive voltage VGH2, and outputs the result as the PMOS gate drive signal GATE (P) to the gate of the PMOS transistor PTR of the pixel transistor TR, that is, to a point E illustrated in FIG. 3.

Figure 6:
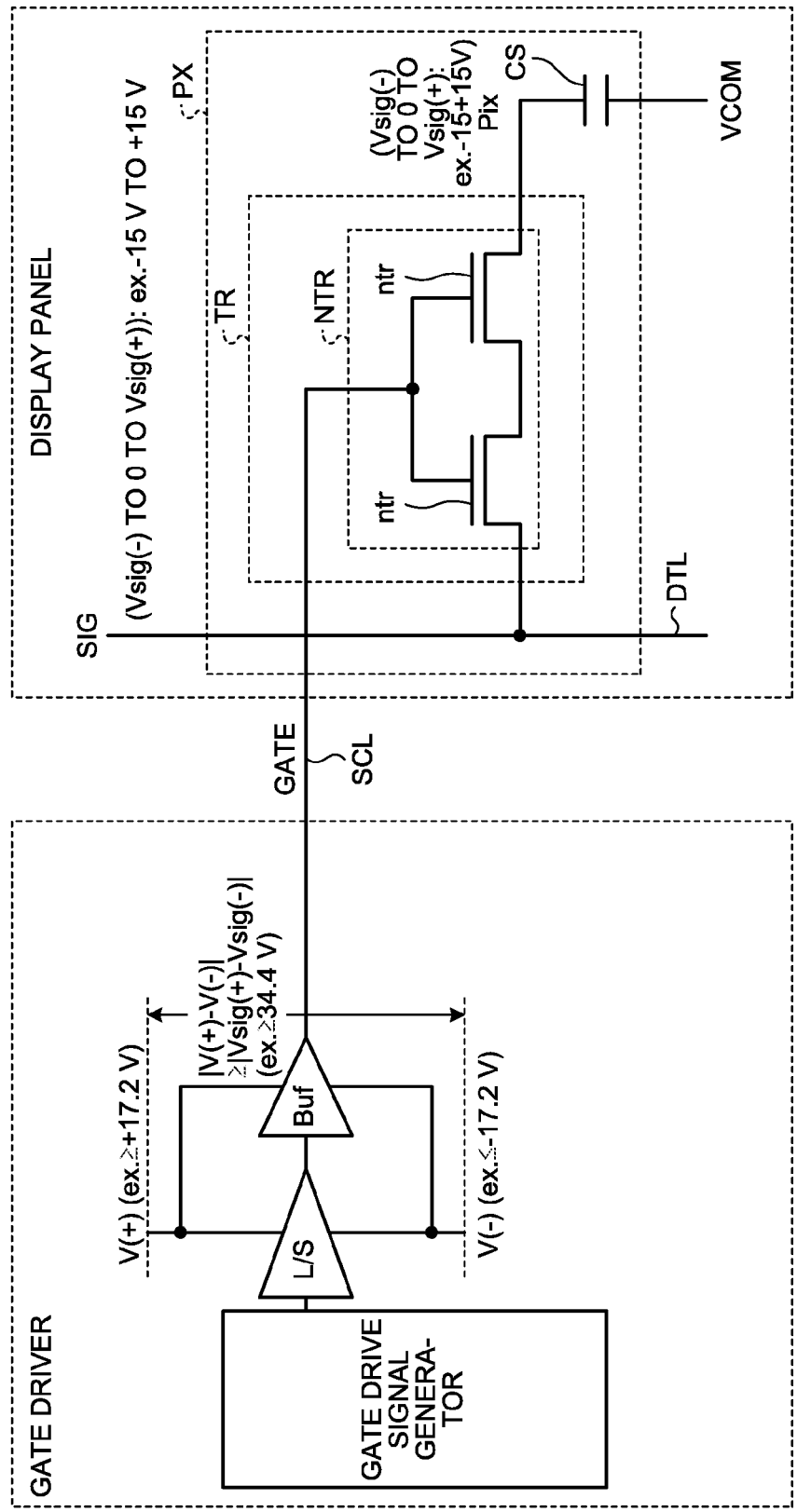
FIG. 6 is a diagram illustrating an exemplary configuration of the pixel transistor and that of the gate driver according to a comparative example of the first embodiment.

The following describes the voltage ranges at the various parts in the display apparatus 100 according to the present embodiment, with reference to FIGS. 3 to 6. FIG. 6 is a diagram illustrating an exemplary configuration of the pixel transistor and that of the gate driver according to a comparative example of the first embodiment.

In the example illustrated in FIG. 4, a voltage range a represents the voltage range within which the gate drive original signal GATE (O) output from the gate drive signal generator 220 can vary, that is, the voltage range at the point A illustrated in FIG. 3. A voltage range b represents the voltage range within which the output from the first positive-phase voltage converter 2211 can vary, that is, the voltage range at the point B illustrated in FIG. 3. A voltage range c represents the voltage range within which the NMOS gate drive signal GATE (N) output from the second positive-phase voltage converter 2212 can vary, that is, the voltage range at the point C illustrated in FIG. 3. A voltage range a' represents the voltage range within which the output from the polarity inverter 2220 can vary, that is, the voltage range at the point A' illustrated in FIG. 3. A voltage range d represents the voltage range within which the output from the first opposite-phase voltage converter 2221 can vary, that is, the voltage range at the point D illustrated in FIG. 3. A voltage range e represents the voltage range within which the PMOS gate drive signal GATE (P) output from the second opposite-phase voltage converter 2222 can vary, that is, the voltage range at the point E illustrated in FIG. 3. A voltage range f, g represents the voltage range of the source drive signal (video signal) SIG and the pixel electrode Pix.

In the present embodiment, the first positive voltage VGH1 and the first negative voltage VGL1 have an equal potential difference from the GND potential (|VGH1−GND|=|GND−VGL1|). In the present embodiment, the second positive voltage VGH2 and the second negative voltage VGL2 have an equal potential difference from the GND potential (|VGH2−GND|=|GND−VGL2|). In other words, both the middle value of the potential difference between the first positive voltage VGH1 and the first negative voltage VGL1 and the middle value of the second positive voltage VGH2 and the second negative voltage VGL2 are equal to the GND potential.

FIG. 6 illustrates the comparative example of the first embodiment, in which only the NMOS transistor NTR constitutes the pixel transistor TR. The voltage value of the gate drive signal GATE for keeping the pixel transistor TR off needs to be lower than the voltage lower limit value of the source drive signal (video signal) SIG, and the voltage value of the gate drive signal GATE for keeping the pixel transistor TR on needs to be higher than the voltage upper limit value of the source drive signal (video signal) SIG. For this reason, when only the NMOS transistor NTR constitutes the pixel transistor TR as illustrated in FIG. 6, to drive the voltage of the pixel electrode Pix to be within the same voltage range of Vsig(−) to Vsig(+) as that of the source drive signal (video signal) SIG, the voltage range of the gate drive signal supplied from the gate driver 22 needs to be larger than |Vsig(+)−Vsig(−)| so that the source drive signal (video signal) SIG can control on/off of the pixel transistor TR. In other words, in the configuration illustrated in FIG. 6, the range |V(+)−V(−)| of a power supply voltage supplied to the level shifter circuit and the buffer circuit needs to be larger than |Vsig(+)−Vsig(−)|(|V(+)−V(−)|>|Vsig(+)−Vsig(−)|).

For example, in the case where the voltage value of the gate drive signal GATE for keeping the pixel transistor TR off is larger by 2.2 V on the negative side than the voltage lower limit value of the source drive signal (video signal) SIG, and the voltage value of the gate drive signal GATE for keeping the pixel transistor TR on is larger by 2.2 V on the positive side than the voltage upper limit value of the source drive signal (video signal) SIG, when the voltage range of the source drive signal (video signal) SIG is from −15 V to +15 V, having a width of 30 V, the voltage range of the gate drive signal supplied from the gate driver 22 needs to be from −17.2 V to +17.2 V. For this purpose, in the configuration illustrated in FIG. 6, the level shifter circuit and the buffer circuit need to be supplied with a positive power supply voltage V(+) of 17.2 V or higher and a negative power supply voltage V(−) of −17.2 V or lower. In this case, the potential difference |V(+)−V(−)| between the negative power supply voltage V(−) and the positive power supply voltage V(+) in the level shifter circuit and the buffer circuit amounts to 34.4 V or higher (|V(+)−V(−)|≥34.4 V).

In contrast to the comparative example illustrated in FIG. 6, in the display apparatus 100 according to the present embodiment, each of the pixel transistors TR includes the NMOS transistor NTR and the PMOS transistor PTR, and the voltage for turning on the gate of each thereof is set to the middle value of the potential difference between the voltage upper limit value Vsig(+) and the voltage lower limit value Vsig(−) of the source drive signal (video signal) SIG (herein, GND potential). Consequently, the voltage difference applied to each of the NMOS transistor NTR and the PMOS transistor PTR can be reduced. In addition, as illustrated in FIG. 4, the second negative voltage VGL2 serving as the lower voltage of the NMOS gate drive signal GATE (N) for keeping the NMOS transistor NTR of the pixel transistor TR off is set to be lower than the voltage lower limit value Vsig(−) of the source drive signal (video signal) SIG, and the second positive voltage VGH2 serving as the higher voltage of the PMOS gate drive signal GATE (P) for keeping the PMOS transistor PTR of the pixel transistor TR off is set to be higher than the voltage upper limit value Vsig(+) of the source drive signal (video signal) SIG. Meanwhile, each of the voltage range a (|VGH1−VGL1|) within which the gate drive original signal GATE (O) output from the gate drive signal generator 220 can vary, the voltage range b (|GND−VGL1|) within which the output from the first positive-phase voltage converter 2211 can vary, the voltage range c (|GND−VGL2|) within which the NMOS gate drive signal GATE (N) output from the second positive-phase voltage converter 2212 can vary, the voltage range a' (|VGH1−VGL1|) within which the output from the polarity inverter 2220 can vary, the voltage range d (|VGH1−GND|) within which the output from the first opposite-phase voltage converter 2221 can vary, and the voltage range e (|VGH2−GND|) within which the PMOS gate drive signal GATE (P) output from the second opposite-phase voltage converter 2222 can vary can be made smaller than the voltage range f, g (|Vsig(+)−Vsig(−)|) of the source drive signal (video signal) SIG and the pixel electrode Pix.

For example, assume a case where the first positive voltage VGH1 is set to +8.6 V, the second positive voltage VGH2 is set to +17.2 V that is larger by 2.2 V on the positive side than the voltage upper limit value Vsig(+) of the source drive signal (video signal) SIG, the first negative voltage VGL1 is set to −8.6 V, and the second negative voltage VGL2 is set to −17.2 V that is larger by 2.2 V on the negative side than the voltage lower limit value Vsig(−) of the source drive signal (video signal) SIG. In this case, the voltage ranges are as follows: the voltage range a (|VGH1−VGL1|) within which the gate drive original signal GATE (O) output from the gate drive signal generator 220 can vary is 17.2 V wide; the voltage range b (|GND−VGL1|) within which the output from the first positive-phase voltage converter 2211 can vary is 8.6 V wide; the voltage range c (|GND−VGL2|) within which the NMOS gate drive signal GATE (N) output from the second positive-phase voltage converter 2212 can vary is 17.2 V wide; the voltage range a' (|VGH1−VGL1|) within which the output from the polarity inverter 2220 can vary is 17.2 V wide; the voltage range d (|VGH1−GND|) within which the output from the first opposite-phase voltage converter 2221 can vary is 8.6 V wide; and the voltage range e (|VGH2−GND|) within which the PMOS gate drive signal GATE (P) output from the second opposite-phase voltage converter 2222 can vary is 17.2 V wide.

As a result, the display apparatus 100 according to the present embodiment can lower the risk of property degradation in the components constituting the pixel transistor TR and the gate driver 22 and prevent the degradation in reliability, in comparison with the comparative example illustrated in FIG. 6. The display apparatus 100 according to the present embodiment can also reduce the power consumption in the gate driver 22 in comparison with the comparative example illustrated in FIG. 6, thereby realizing the driving with low power consumption.

In the present embodiment, the first positive voltage VGH1 and the first negative voltage VGL1 have an equal potential difference from the GND potential (|VGH1−GND|=|GND−VGL1|). However, the first positive voltage VGH1 can have any value between the second positive voltage VGH2 and the GND potential, and the first negative voltage VGL1 can have any value between the second negative voltage VGL2 and the GND potential. Thus, the values of VGH1 and VGL1 may be set so that |VGH1−GND| and |GND−VGL1| have different values.

In the present embodiment, the second positive voltage VGH2 and the second negative voltage VGL2 are set to have an equal potential difference from the GND potential (|VGH2−GND|=|GND−VGL2|). However, the second positive voltage VGH2 only needs to be larger on the positive side than the voltage upper limit value Vsig(+) of the source drive signal (video signal) SIG, and the second negative voltage VGL2 only needs to be larger on the negative side than the voltage lower limit value Vsig(−) of the source drive signal (video signal) SIG. VGH2 and VGL2 may be set so that the absolute values |VGH2−GND| and|GND−VGL2| have different values from each other.

The following describes an operation example in the display apparatus 100 according to the present embodiment, with reference to FIGS. 3 to 5.

FIG. 5 illustrates in (a) a waveform example of the gate drive original signal GATE (O) output from the gate drive signal generator 220, that is, a waveform example at the point A illustrated in FIG. 3. FIG. 5 illustrates in (a') a waveform example of the output from the polarity inverter 2220, that is, a waveform example at the point A' illustrated in FIG. 3. FIG. 5 illustrates in (b) a waveform example of the output from the first positive-phase voltage converter 2211, that is, a waveform example at the point B illustrated in FIG. 3. FIG. 5 illustrates in (c) a waveform example of the NMOS gate drive signal GATE (N) output from the second positive-phase voltage converter 2212, that is, a waveform example at the point C illustrated in FIG. 3. FIG. 5 illustrates in (d) a waveform example of the output from the first opposite-phase voltage converter 2221, that is, a waveform example at the point D illustrated in FIG. 3. FIG. 5 illustrates in (e) a waveform example of the PMOS gate drive signal GATE (P) output from the second opposite-phase voltage converter 2222, that is, a waveform example at the point E illustrated in FIG. 3. FIG. 5 illustrates in (f) a waveform example of the source drive signal (video signal) SIG. FIG. 5 illustrates in (g) a waveform example at the pixel electrode Pix.

In the example illustrated in FIG. 5, times tn0 and tp0 when the gate drive original signal GATE (O) shifts from the lower potential (first negative voltage VGL1) to the higher potential (first positive voltage VGH1) are each called a rising time of the gate drive original signal GATE (O). A time tn1 when the source drive signal (video signal) SIG shifts from the GND potential to the voltage upper limit value Vsig(+) and a time tp1 when the source drive signal (video signal) SIG shifts from the GND potential to the voltage lower limit value Vsig(−) are each called a writing time to the pixel PX. Times tn2 and tp2 when the gate drive original signal GATE (O) shifts from the higher potential (first positive voltage VGH1) to the lower potential (first negative voltage VGL1) are each called a falling time of the gate drive original signal GATE (O). In the present embodiment, a time tn3 when the source drive signal (video signal) SIG shifts from the voltage upper limit value Vsig(+) to the GND potential and a time tp3 when the source drive signal (video signal) SIG shifts from the voltage lower limit value Vsig(−) to the GND potential are provided as the falling times of the source drive signal (video signal) SIG so that the source drive signal (video signal) SIG has the GND potential at the rising times tn0 and tp0 of the gate drive original signal GATE (O).

In a frame 1 illustrated in FIG. 5, after the source drive signal (video signal) SIGm (hereinafter, simply called "SIG") is supplied to the m-th pixel row and the p-th pixel column is selected, the NMOS gate drive signal GATEp (N) (hereinafter, simply called "GATE (N)") shifts from a lower potential (second negative voltage VGL2) to a higher potential (GND potential), and the PMOS gate drive signal GATEp (P) (hereinafter, simply called "GATE (P)") shifts from a higher potential (second positive voltage VGH2) to a lower potential (GND potential), at the rising time tn0 of the gate drive original signal GATEp (O) (hereinafter, simply called "GATE (O)"). This operation changes the gate voltage of the NMOS transistor NTR to the GND potential, changes the gate voltage of the PMOS transistor PTR to the GND potential, and turns on the pixel transistor TR.

As illustrated in FIG. 5, if the potential of the pixel electrode Pix immediately before the rising time tn0 of the gate drive original signal GATE (O) is equal to the voltage lower limit value Vsig(−) of the source drive signal (video signal) SIG, the voltage between the gate and the source of the pixel transistor TR is brought to zero before the time elapses from the rising time tn0 of the gate drive original signal GATE (O) to the writing time tn1 to the pixel PX. Consequently, the pixel electrode Pix is not supplied with the GND potential, and a discharge residual voltage Voffset appears at the pixel electrode Pix. The discharge residual voltage Voffset is discharged and the potential of the pixel electrode Pix is stabilized to the GND potential by allowing a sufficient length of time from the rising time tn0 of the gate drive original signal GATE (O) to the writing time tn1 to the pixel PX. However, the time for supplying the source drive signal (video signal) SIG to one pixel row during one frame is limited by the frame rate. Consequently, in the present embodiment, the writing to the pixel PX is performed (at tn1 in FIG. 5) before the discharge residual voltage Voffset is completely discharged.

When the source drive signal (video signal) SIG shifts from the GND potential to the voltage upper limit value Vsig(+) at the writing time tn1 to the pixel PX, the potential of the pixel electrode Pix is changed to the voltage upper limit value Vsig(+) of the source drive signal (video signal) SIG through the PMOS transistor PTR, and the pixel transistor TR is saturated.

Then, at the falling time tn2 of the gate drive original signal GATE (O), the NMOS gate drive signal GATE (N) shifts from the higher potential (GND potential) to the lower potential (second negative voltage VGL2), and the PMOS gate drive signal GATE (P) shifts from the lower potential (GND potential) to the higher potential (second positive voltage VGH2). This operation changes the gate voltage of the NMOS transistor NTR to the second negative voltage VGL2, changes the gate voltage of the PMOS transistor PTR to the second positive voltage VGH2, and turns off the pixel transistor TR.

Even when the source drive signal (video signal) SIG shifts from the voltage upper limit value Vsig(+) to the GND potential at the falling time tn3 of the source drive signal (video signal) SIG, the pixel transistor TR remains to be off, and the pixel capacitor CS causes the potential of the pixel electrode Pix to remain at the voltage upper limit value Vsig(+) of the source drive signal (video signal) SIG.

Subsequently, in a frame 2 illustrated in FIG. 5, when the source drive signal (video signal) SIG is supplied to the m-th pixel row and the p-th pixel column is selected, the NMOS gate drive signal GATE (N) shifts from the lower potential (second negative voltage VGL2) to the higher potential (GND potential), and the PMOS gate drive signal GATE (P) shifts from the higher potential (second positive voltage VGH2) to the lower potential (GND potential), at the rising time tp0 of the gate drive original signal GATE (O). This operation changes the gate voltage of the NMOS transistor NTR to the GND potential, changes the gate voltage of the PMOS transistor PTR to the GND potential, and turns on the pixel transistor TR.

As illustrated in FIG. 5, if the potential of the pixel electrode Pix immediately before the rising time tp0 of the gate drive original signal GATE (O) is equal to the voltage upper limit value Vsig(+) of the source drive signal (video signal) SIG, the voltage between the gate and the source of the pixel transistor TR is brought to zero before the time elapses from the rising time tp0 of the gate drive original signal GATE (O) to the writing time tp1 to the pixel PX. Consequently, the pixel electrode Pix is not supplied with the GND potential, and the discharge residual voltage Voffset appears at the pixel electrode Pix. The discharge residual voltage Voffset is discharged and the potential of the pixel electrode Pix is stabilized to the GND potential by allowing a sufficient length of time from the rising time tp0 of the gate drive original signal GATE (O) to the writing time tp1 to the pixel PX. However, the time for supplying the source drive signal (video signal) SIG to one pixel row during one frame is limited by the frame rate. Consequently, in the present embodiment, the writing to the pixel PX is performed (at tp1 in FIG. 5) before the discharge residual voltage Voffset is completely discharged.

When the source drive signal (video signal) SIG shifts from the GND potential to the voltage lower limit value Vsig(−) at the writing time tp1 to the pixel PX, the potential of the pixel electrode Pix is changed to the voltage lower limit value Vsig(−) of the source drive signal (video signal) SIG through the NMOS transistor NTR, and the pixel transistor TR is saturated.

Then, at the falling time tp2 of the gate drive original signal GATE (O), the NMOS gate drive signal GATE (N) shifts from the higher potential (GND potential) to the lower potential (second negative voltage VGL2), and the PMOS gate drive signal GATE (P) shifts from the lower potential (GND potential) to the higher potential (second positive voltage VGH2). This operation changes the gate voltage of the NMOS transistor NTR to the second negative voltage VGL2, changes the gate voltage of the PMOS transistor PTR to the second positive voltage VGH2, and turns off the pixel transistor TR.

Even when the source drive signal (video signal) SIG shifts from the voltage lower limit value Vsig(−) to the GND potential at the falling time tp3 of the source drive signal (video signal) SIG, the pixel transistor TR remains to be off, and the pixel capacitor CS causes the potential of the pixel electrode Pix to remain at the voltage lower limit value Vsig(−) of the source drive signal (video signal) SIG.

As described above, the display apparatus 100 according to the present embodiment can drive the pixel transistor TR using the NMOS gate drive signal GATE (N) and the PMOS gate drive signal GATE (P), each of which has a voltage amplitude value smaller than the voltage range (|Vsig(+)−Vsig(−)|) of the source drive signal (video signal) SIG. This configuration can lower the risk of property degradation in the components constituting the pixel transistor TR and the gate driver 22, and prevent the degradation in reliability. Further, the configuration can reduce the power consumption in the gate driver 22, thereby realizing the driving with low power consumption.

In the present embodiment, the source drive signal (video signal) SIG is controlled so as to shift from the voltage upper limit value Vsig(+) of the SIG to the voltage lower limit value Vsig(−) of the SIG via the GND potential, and shift from the voltage lower limit value Vsig(−) of the SIG to the voltage upper limit value Vsig(+) of the SIG via the GND potential. Specifically, the source drive signal (video signal) SIG is at the GND potential at the rising time tn0 of the gate drive original signal GATE (O), and shifts from the GND potential to the voltage upper limit value Vsig(+) at the writing time tn1 to the pixel PX. The source drive signal (video signal) SIG is at the GND potential at the rising time tp0 of the gate drive original signal GATE (O), and shifts from the GND potential to the voltage lower limit value Vsig(−) at the writing time tp1 to the pixel PX.

For example, when the source drive signal (video signal) SIG shifts to the upper limit voltage Vsig(+) and the pixel transistor TR is turned on in the state where the pixel electrode Pix is maintained at the lower limit voltage Vsig(−) of the source drive signal (video signal) SIG, carriers instantaneously move (a large current instantaneously flows) while a voltage of |Vsig(+)−Vsig(−)|(2□ Vsig when |Vsig (+)|=|−Vsig(−)|=Vsig) is applied between the source and the drain of the pixel transistor TR. This phenomenon can cause degradation of the pixel transistor TR.

As described above, in the present embodiment, the control is performed so as to set the source drive signal (video signal) SIG to the GND potential at the writing times tn1 and tp1 to the pixel PX, and, in this state, to turn on the pixel transistor TR at the rising times tn0 and tp0 of the gate drive original signal GATE (O). This control can lower the voltage between the source and the drain of the pixel transistor TR (|Vsig(+)−GND| and |GND−Vsig(−)|) when the carriers move (current flows). This can prevent the degradation of the pixel transistor TR.

In the present embodiment, the configuration has been described in which the higher potential of the NMOS gate drive signal GATE (N) and the lower potential of the PMOS gate drive signal GATE (P) are equal to the middle value of the potential difference between the voltage higher limit value Vsig(+) and the voltage lower limit value Vsig(−) of the source drive signal (video signal) SIG (herein, GND potential). However, the operation can be performed if the higher potential of the NMOS gate drive signal GATE (N) has a predetermined value that can turn on the NMOS transistor NTR, and the lower potential of the PMOS gate drive signal GATE (P) has a predetermined value that can turn on the PMOS transistor PTR. In other words, the following configuration can be employed: the second negative voltage VGL2 serving as the lower potential of the NMOS gate drive signal GATE (N) for keeping the off-state of the NMOS transistor NTR of the pixel transistor TR is set to be lower than the voltage lower limit value Vsig(−) of the source drive signal (video signal) SIG, while the higher potential of the NMOS gate drive signal GATE (N) is set to the predetermined value that can turn on the NMOS transistor NTR; and the second positive voltage VGH2 serving as the higher potential of the PMOS gate drive signal GATE (P) for keeping the off-state of the PMOS transistor PTR of the pixel transistor TR is set to be higher than the voltage upper limit value Vsig(+) of the source drive signal (video signal) SIG, while the lower potential of the PMOS gate drive signal GATE (P) is set to the predetermined value that can turn on the PMOS transistor PTR.

In other words, the gate-on potential of each of the NMOS transistor NTR and the PMOS transistor PTR is not limited to the GND potential described above. For example, the gate-on potential of the NMOS transistor NTR can be set to a voltage higher than the GND potential and lower than the first positive voltage VGH1, and the gate-on potential of the PMOS transistor PTR can be set to a voltage lower than the GND potential and higher than the first negative voltage VGL1.

As described above, the display apparatus 100 of the first embodiment is configured such that the pixel transistor TR constituting the pixel PX together with the pixel capacitor CS includes the NMOS transistor NTR coupled between the video signal line DTL and the pixel capacitor CS, and also includes the PMOS transistor PTR coupled in parallel with the NMOS transistor NTR. This configuration allows the pixel transistor TR to be driven using the NMOS gate drive signal GATE (N) and the PMOS gate drive signal GATE (P), each of which has the voltage amplitude value smaller than the voltage range (|Vsig(+)−Vsig(−)|) of the source drive signal (video signal) SIG.

Specifically, the lower potential of the NMOS gate drive signal GATE (N) supplied to the NMOS transistor NTR is set to be lower than the voltage lower limit value Vsig(−) of the source drive signal (video signal) SIG in order to keep the off-state of the NMOS transistor NTR, while the higher potential of the NMOS gate drive signal GATE (N) is set to the predetermined value that can turn on the NMOS transistor NTR. The higher voltage of the PMOS gate drive signal GATE (P) supplied to the PMOS transistor PTR is set to be higher than the voltage upper limit value Vsig(+) of the source drive signal (video signal) SIG in order to keep the off-state of the PMOS transistor PTR, while the lower potential of the PMOS gate drive signal GATE (P) is set to the predetermined value that can turn on the PMOS transistor PTR. This configuration can narrow the voltage ranges within which the voltages of the various parts of the gate driver 22 for generating the NMOS gate drive signal GATE (N) and the PMOS gate drive signal GATE (P) can vary, in comparison with voltage ranges in the case where only the NMOS transistor constitutes the pixel transistor.

More specifically, the gate-on potential of the NMOS transistor NTR may be set to the middle value of the potential difference between the voltage higher limit value Vsig(+) and the voltage lower limit value Vsig(−) of the source drive signal (video signal) SIG (GND potential), or may be set to, for example, a voltage higher than the GND potential and lower than the first positive voltage VGH1. The gate-on potential of the PMOS transistor PTR may be set to the middle value of the potential difference between the voltage higher limit value Vsig(+) and the voltage lower limit value Vsig(−) of the source drive signal (video signal) SIG (GND potential), or may be set to, for example, a voltage lower than the GND potential and higher than the first negative voltage VGL1.

Therefore, this configuration can lower the risk of property degradation in the components constituting the pixel transistor TR and the gate driver 22, and prevent the degradation in reliability. Further, the configuration can reduce the power consumption in the gate driver 22, thereby realizing the driving with low power consumption.

The present embodiment can prevent the degradation in reliability, and thus the display apparatus 100 capable of performing driving with low power consumption can be provided.

Second Embodiment

Figure 7:
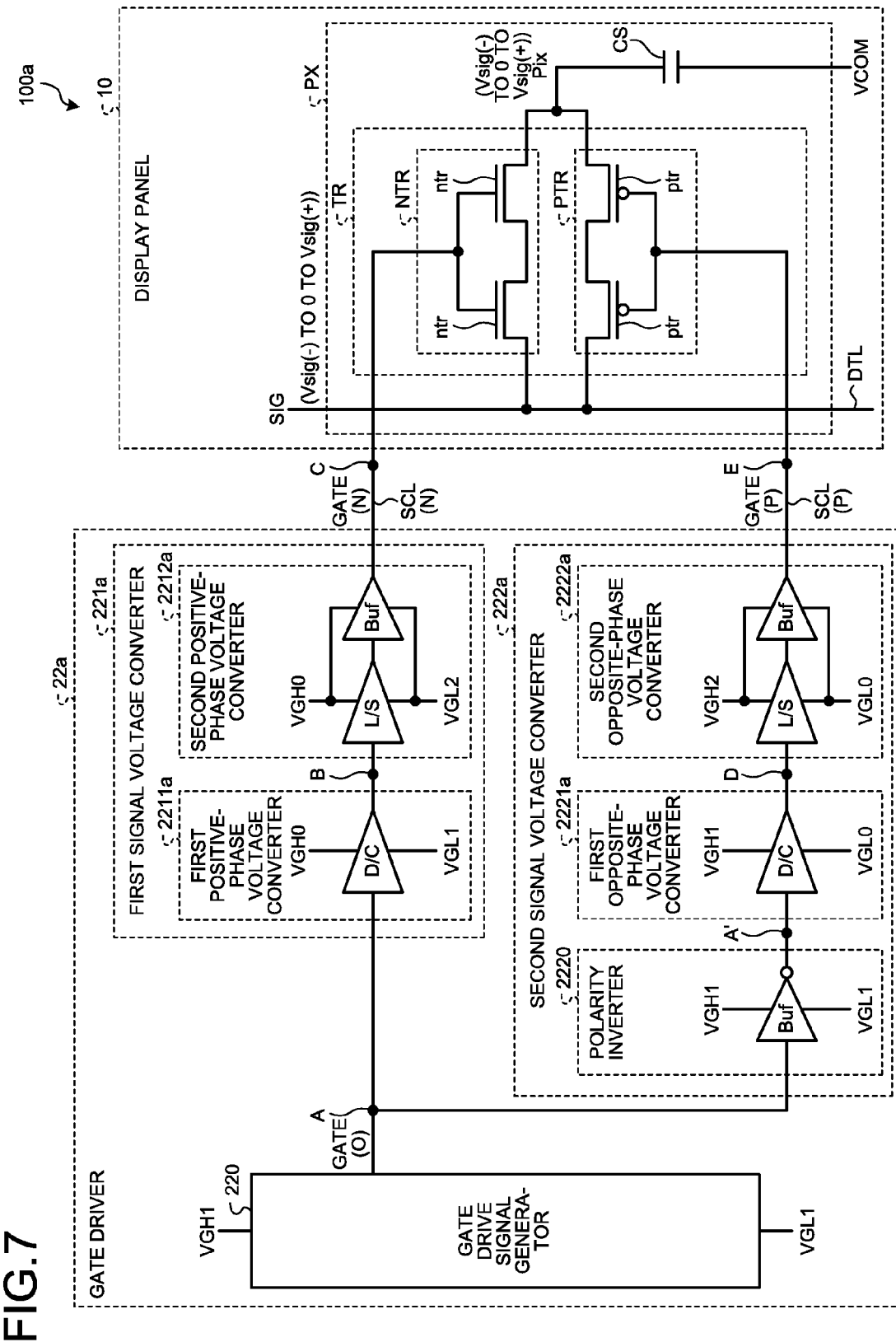
FIG. 7 is a diagram illustrating an exemplary configuration of the pixel transistor and that of a gate driver in a display apparatus according to a second embodiment of the present invention.
Figure 8:
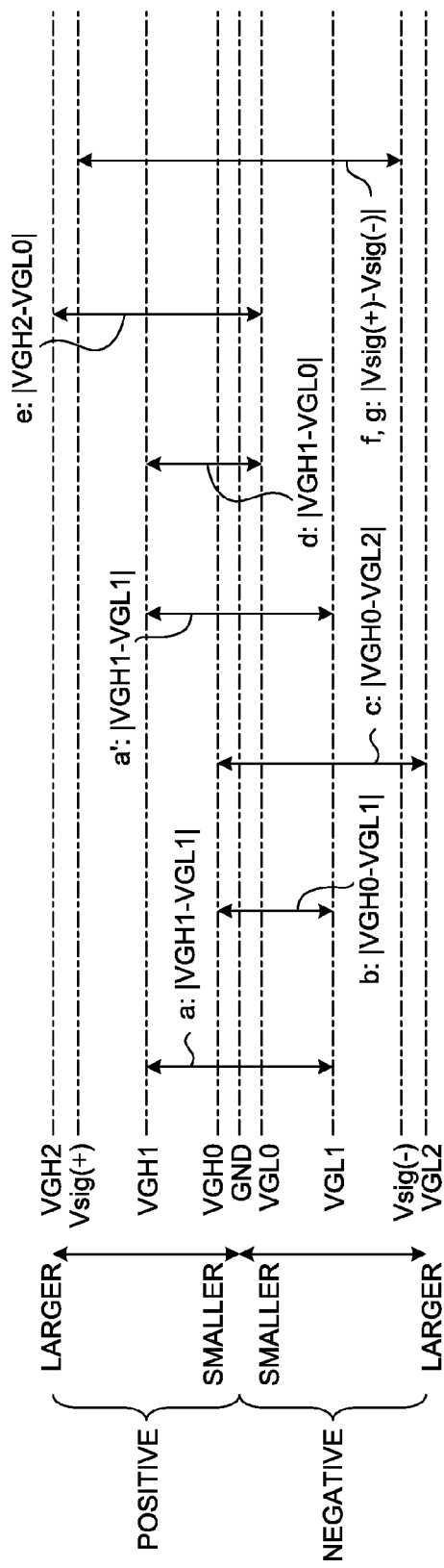
FIG. 8 is a diagram illustrating a magnitude relation among voltages at various parts and voltage ranges at the various parts in the configuration illustrated in FIG. 7.

FIG. 7 is a diagram illustrating an exemplary configuration of the pixel transistor and that of a gate driver in a display apparatus according to a second embodiment of the present invention. FIG. 8 is a diagram illustrating a magnitude relation among voltages at various parts and voltage ranges at the various parts in the configuration illustrated in FIG. 7. FIG. 9 is a diagram illustrating exemplary waveforms at various parts in the configuration illustrated in FIG. 7. The schematic configuration of a display system applied to the display apparatus according to the second embodiment and the schematic configuration of the display apparatus according to the second embodiment are the same as those of the first embodiment, and thus the description thereof will not be repeated. The same components as those described in the first embodiment above are denoted by the same reference numerals, and the description thereof will not be repeated.

The first embodiment has been described using the specific configuration example in which the GND potential and the first negative voltage VGL1 are supplied to the first positive-phase voltage converter 2211 of the first signal voltage converter 221, and the GND potential and the second negative voltage VGL2 are supplied to the second positive-phase voltage converter 2212 of the first signal voltage converter 221. In this configuration according to the first embodiment, the higher potential of the NMOS gate drive signal GATE (N) is equal to the GND potential, and the potential of the pixel electrode Pix reaches, immediately before the writing time tn1 to the pixel PX, a potential smaller by the discharge residual voltage Voffset on the negative side than the GND potential (refer to (g) in FIG. 5), as described in the first embodiment.

The first embodiment has been described using the configuration example in which the GND potential and the first positive voltage VGH1 are supplied to the first opposite-phase voltage converter 2221 of the second signal voltage converter 222, and the GND potential and the second positive voltage VGH2 are supplied to the second opposite-phase voltage converter 2222 of the second signal voltage converter 222. In this configuration according to the first embodiment, the lower potential of the PMOS gate drive signal GATE (P) is equal to the GND potential, and the potential of the pixel electrode Pix reaches, immediately before the writing time tp1 to the pixel PX, a potential larger by the discharge residual voltage Voffset on the positive side than the GND potential (refer to (g) in FIG. 5), as described in the first embodiment.

Assume a case where the display apparatus is configured such that the source drive signal (video signal) SIG can take only the voltage upper limit value Vsig(+) or the voltage lower limit value Vsig(−) as exemplified by the example illustrated in FIG. 5 according to the first embodiment, i.e., a case where an image displayed on the display panel 10 is constituted by only the maximum luminance (white) and the minimum luminance (black) and cannot take an intermediate luminance value, i.e., the source drive signal (video signal) SIG cannot take an intermediate potential. In this case, an offset of the potential of the pixel electrode Pix against the GND potential immediately before the writing times tn1 and tp1 to the pixel PX makes little influence. On the other hand, in a case where the display apparatus is configured such that an image displayed on the display panel 10 can take an intermediate luminance value, intermediate luminance values of an original image may not be reproduced on the image. In particular, if the source drive signal (video signal) SIG shifts to a potential near the GND potential at the writing times tn1 and tp1 to the pixel PX, the writing to the pixel PX may be unable to be performed.

As illustrated in FIG. 7, in a display apparatus 100a according to the present embodiment, a first positive-phase voltage converter 2211a and a second positive-phase voltage converter 2212a of a first signal voltage converter 221a are supplied with a third positive voltage VGH0 as power supply larger on the positive side than the GND potential (refer to FIG. 8), instead of the GND potential. In other words, the third positive voltage VGH0 serving as the higher potential of the NMOS gate drive signal GATE (N) only needs to be higher than the middle value of the potential difference between the voltage upper limit value Vsig(+) and the voltage lower limit value Vsig(−) of the source drive signal (video signal) SIG (herein, GND potential).

Alternatively, as illustrated in FIG. 7, a first opposite-phase voltage converter 2221a and a second opposite-phase voltage converter 2222a of a second signal voltage converter 222a may be supplied with a third negative voltage VGL0 as power supply larger on the negative side than the GND potential (refer to FIG. 8), instead of the GND potential. In other words, the third negative voltage VGL0 serving as the lower potential of the PMOS gate drive signal GATE (P) only needs to be lower than the middle value of the potential difference between the voltage upper limit value Vsig(+) and the voltage lower limit value Vsig(−) of the source drive signal (video signal) SIG (herein, GND potential).

This configuration allows the middle value of the potential difference between the voltage upper limit value Vsig(+) and the voltage lower limit value Vsig(−) of the source drive signal (video signal) SIG (herein, GND potential) to be supplied to the pixel electrode Pix at the writing times tn1 and tp1 to the pixel PX. Consequently, the intermediate luminance values of the original image can be reproduced even if the display apparatus is configured such that the image displayed on the display panel 10 can take an intermediate luminance value. Further, the writing to the pixel PX can be performed even if the source drive signal (video signal) SIG shifts to a potential near the GND potential at the writing times tn1 and tp1 to the pixel PX.

In the present embodiment, only either of the NMOS transistor NTR and the PMOS transistor PTR needs to supply the middle value of the potential difference between the voltage upper limit value Vsig(+) and the voltage lower limit value Vsig(−) of the source drive signal (video signal) SIG (herein, GND potential) to the pixel electrode Pix at the writing times tn1 and tp1 to the pixel PX, but the present invention is not specifically limited to this configuration. Thus, the gate-on potential of only either of the NMOS transistor NTR and the PMOS transistor PTR included in one pixel transistor TR needs to be set to a value different from the middle value of the potential difference between the voltage upper limit value Vsig(+) and the voltage lower limit value Vsig(−) of the source drive signal (video signal) SIG (herein, GND potential), and the gate-on potential of the other of the transistors may remain at the middle value of the potential difference between the voltage upper limit value Vsig(+) and the voltage lower limit value Vsig(−) of the source drive signal (video signal) SIG (herein, GND potential).

Assume the case where the display apparatus is configured such that the source drive signal (video signal) SIG can take only the voltage upper limit value Vsig(+) or the voltage lower limit value Vsig(−) as exemplified by the example illustrated in FIG. 5 according to the first embodiment, i.e., the case where an image displayed on the display panel 10 is constituted by only the maximum luminance (white) and the minimum luminance (black) and cannot take an intermediate luminance value, i.e., the source drive signal (video signal) SIG cannot take an intermediate potential. In this case, the display apparatus can perform the operation if the third positive voltage VGH0 has a predetermined value that can turn on the NMOS transistor NTR, and the third negative voltage VGL0 has a predetermined value that can turn on the PMOS transistor PTR. Even in this case, however, it is preferable that the third positive voltage VGH0 and the third negative voltage VGL0 take such values as taking consideration of lowering the risk of property degradation in the components constituting a gate driver 22a or lowering the power consumption in the gate driver 22a.

As described above, according to the display apparatus 100a of the second embodiment, the potential of the pixel electrode Pix at the writing time to the pixel PX can be set to the middle value of the potential difference between the voltage upper limit value Vsig(+) and the voltage lower limit value Vsig(−) of the source drive signal (video signal) SIG by setting the higher potential of the NMOS gate drive signal GATE (N) to be higher than the middle value of the potential difference between the voltage upper limit value Vsig(+) and the voltage lower limit value Vsig(−) of the source drive signal (video signal) SIG. Further, the potential of the pixel electrode Pix at the writing time to the pixel PX can be set to the middle value of the potential difference between the voltage upper limit value Vsig(+) and the voltage lower limit value Vsig(−) of the source drive signal (video signal) SIG by setting the lower potential of the PMOS gate drive signal GATE (P) to be lower than the middle value of the potential difference between the voltage upper limit value Vsig(+) and the voltage lower limit value Vsig(−) of the source drive signal (video signal) SIG. Consequently, the intermediate luminance values of the original image can be reproduced even if the display apparatus is configured such that an image displayed on the display panel 10 can take an intermediate luminance value. The writing to the pixel PX can be performed even if the source drive signal (video signal) SIG shifts to a potential near the GND potential at the writing times tn1 and tp1 to the pixel PX.

In the embodiments described above, the power supply voltages, such as the first, second, and third positive voltages VGH1, VGH2, and VGH0 and the first, second, and third negative voltages VGL1, VGL2, and VGL0 may be configured such that any one of the positive voltages supplied from the power supply circuit 200 is increased or decreased to generate the other positive voltages, or may be configured such that any one of the negative voltages supplied from the power supply circuit 200 is increased or decreased to generate the other negative voltages. All the power supply voltages may be configured to be generated and supplied from the power supply circuit 200. However, the present invention is not limited to the configuration of generating or supplying the power supply voltages.

The above embodiments have been described by way of the example using the electrophoretic display apparatus. The present invention can, however, be applied to a liquid crystal display apparatus, for example, in which the source drive signal (video signal) SIG is in the range of −5 V to +5 V, for example. Even when the present invention is applied to such a display apparatus, the voltage ranges can be narrowed within which the voltages of the various parts of the gate driver 22 or 22a for generating the NMOS gate drive signal GATE (N) and the PMOS gate drive signal GATE (P) can vary. This can realize the driving with low power consumption. In particular, the configuration described in the second embodiment is suitable for a display apparatus capable of color display that needs to display intermediate luminance values.

The elements of the embodiments described above can be combined as appropriate. The present invention can naturally provide other advantageous effects that are provided by the aspects described in the embodiments above and are clearly defined by the description in the present specification or appropriately conceivable by those skilled in the art.

What is claimed is:

1. A display apparatus comprising:
a display panel including a plurality of pixels each including a pixel capacitor and a pixel transistor, a scanning line that is coupled to the respective pixels and is configured to receive a scan signal, and a video signal line that is coupled to the respective pixels and is configured to receive a video signal; and
a driver configured to drive the display panel, wherein the pixel transistor includes:
    at least one N-channel metal oxide semiconductor (NMOS) transistor coupled between the video signal line and the pixel capacitor; and
    a P-channel metal oxide semiconductor (PMOS) transistor coupled in parallel with the NMOS transistor,
wherein the scanning line includes:
    a first scanning line coupled to a gate of the at least one NMOS transistor; and
    a second scanning line coupled to a gate of the at least one PMOS transistor,
wherein the driver comprises a gate driver configured to:
generate and supply, to the first scanning line, an NMOS gate drive signal to drive the gate of the at least one NMOS transistor; and
generate and supply, to the second scanning line, a PMOS gate drive signal to drive the gate of the at least one PMOS transistor,
wherein the NMOS gate drive signal has polarity inverted from polarity of the PMOS gate drive signal,
wherein a lower potential of the NMOS gate drive signal is lower than a voltage lower limit value of a signal supplied to the video signal line, and
wherein a higher potential of the PMOS gate drive signal is higher than a voltage upper limit value of the signal supplied to the video signal line,
wherein a higher potential of the NMOS gate drive signal is equal to a middle value of a potential difference between the voltage upper limit value and the voltage lower limit value of the signal supplied to the video signal line, and
wherein a lower potential of the PMOS gate drive signal is equal to the middle value of the potential difference between the voltage upper limit value and the voltage lower limit value of the signal supplied to the video signal line.

2. The display apparatus according to claim 1, wherein the at least one NMOS transistor comprises a plurality of NMOS transistors,
the at least one PMOS transistor comprises a plurality of PMOS transistors, and
in the pixel transistor, the NMOS transistors are coupled in series between the video signal line and the pixel capacitor, and the PMOS transistors, the number of which is identical to that of the NMOS transistors, are coupled in series between the video signal line and the pixel capacitor.

3. A display apparatus comprising:
a display panel including a plurality of pixels each including a pixel capacitor and a pixel transistor, a scanning line that is coupled to the respective pixels and is configured to receive a scan signal, and a video signal line that is coupled to the respective pixels and is configured to receive a video signal; and
a driver configured to drive the display panel, wherein the pixel transistor includes:
    at least one N-channel metal oxide semiconductor (NMOS) transistor coupled between the video signal line and the pixel capacitor; and
    a P-channel metal oxide semiconductor (PMOS) transistor coupled in parallel with the NMOS transistor,
wherein the scanning line includes:
    a first scanning line coupled to a gate of the at least one NMOS transistor; and
    a second scanning line coupled to a gate of the at least one PMOS transistor,
wherein the driver comprises a gate driver configured to:
    generate and supply, to the first scanning line, an NMOS gate drive signal to drive the gate of the at least one NMOS transistor; and
    generate and supply, to the second scanning line, a PMOS gate drive signal to drive the gate of the at least one PMOS transistor,
wherein the NMOS gate drive signal has polarity inverted from polarity of the PMOS gate drive signal,
wherein a lower potential of the NMOS gate drive signal is lower than a voltage lower limit value of a signal supplied to the video signal line, and
a higher potential of the PMOS gate drive signal is higher than a voltage upper limit value of the signal supplied to the video signal line, and
wherein a higher potential of the NMOS gate drive signal is higher than a middle value of a potential difference between the voltage upper limit value and the voltage lower limit value of the signal supplied to the video signal line.

4. The display apparatus according to claim 3, wherein the at least one NMOS transistor comprises a plurality of NMOS transistors,
the at least one PMOS transistor comprises a plurality of PMOS transistors, and in the pixel transistor, the NMOS transistors are coupled in series between the video signal line and the pixel capacitor, and the PMOS transistors, the number of which is identical to that of the NMOS transistors, are coupled in series between the video signal line and the pixel capacitor.

5. A display apparatus comprising:
a display panel including a plurality of pixels each including a pixel capacitor and a pixel transistor, a scanning line that is coupled to the respective pixels and is configured to receive a scan signal, and a video signal line that is coupled to the respective pixels and is configured to receive a video signal; and
a driver configured to drive the display panel, wherein the pixel transistor includes:
    at least one N-channel metal oxide semiconductor (NMOS) transistor coupled between the video signal line and the pixel capacitor; and
    a P-channel metal oxide semiconductor (PMOS) transistor coupled in parallel with the NMOS transistor, wherein the scanning line includes:
- a first scanning line coupled to a gate of the at least one NMOS transistor; and
- a second scanning line coupled to a gate of the at least one PMOS transistor, wherein the driver comprises a gate driver configured to:
- generate and supply, to the first scanning line, an NMOS gate drive signal to drive the gate of the at least one NMOS transistor; and
- generate and supply, to the second scanning line, a PMOS gate drive signal to drive the gate of the at least one PMOS transistor, wherein the NMOS gate drive signal has polarity inverted from polarity of the PMOS gate drive signal, wherein a lower potential of the NMOS gate drive signal is lower than a voltage lower limit value of a signal supplied to the video signal line, and a higher potential of the PMOS gate drive signal is higher than a voltage upper limit value of the signal supplied to the video signal line, and wherein a lower potential of the PMOS gate drive signal is lower than a middle value of a potential difference between the voltage upper limit value and the voltage lower limit value of the signal supplied to the video signal line.

6. The display apparatus according to claim 5, wherein the at least one NMOS transistor comprises a plurality of NMOS transistors, the at least one PMOS transistor comprises a plurality of PMOS transistors, and in the pixel transistor, the NMOS transistors are coupled in series between the video signal line and the pixel capacitor, and the PMOS transistors, the number of which is identical to that of the NMOS transistors, are coupled in series between the video signal line and the pixel capacitor.

* * * * *